US012280794B2

(12) United States Patent
Yangel et al.

(10) Patent No.: US 12,280,794 B2
(45) Date of Patent: Apr. 22, 2025

(54) METHOD FOR PREDICTING A TRAJECTORY OF AN AGENT IN A VICINITY OF A SELF-DRIVING VEHICLE BASED ON RANKING

(71) Applicant: YANDEX SELF DRIVING GROUP LLC, Moscow (RU)

(72) Inventors: Boris Konstantinovich Yangel, Nalchik (RU); Yury Aleksandrovich Biktairov, Mytishchi (RU)

(73) Assignee: Y.E. Hub Armenia LLC, Yerevan (AM)

( * ) Notice: Subject to any disclaimer, the term of this patent is extended or adjusted under 35 U.S.C. 154(b) by 110 days.

(21) Appl. No.: 17/667,854

(22) Filed: Feb. 9, 2022

(65) Prior Publication Data

US 2022/0388532 A1     Dec. 8, 2022

(30) Foreign Application Priority Data

May 28, 2021 (RU) ................................ 2021115369

(51) Int. Cl.
    *B60W 60/00*     (2020.01)
(52) U.S. Cl.
    CPC ..... *B60W 60/001* (2020.02); *B60W 2420/408* (2024.01); *B60W 2554/4049* (2020.02)
(58) Field of Classification Search
    None
    See application file for complete search history.

(56) References Cited

U.S. PATENT DOCUMENTS 9,911,346 B2    3/2018   Klinger et al.
10,801,841 B1 * 10/2020   Rintoul ................. G01C 21/20
(Continued)

FOREIGN PATENT DOCUMENTS

| CN | 111114543 A | 5/2020 |
| CN | 111114543 B | 7/2020 |
| RU | 2699177 C2 | 9/2019 |

OTHER PUBLICATIONS

Biktairov et al. "PRANK: motion Prediction based on RANKing" Published on Oct. 22, 2020, 34th Conference on Neural Information Processing Systems (NeurIPS 2020), Vancouver, Canada, https://arxiv.org/abs/2010.12007v1.
(Continued)

*Primary Examiner* — Hunter B Lonsberry
*Assistant Examiner* — Paysun Wu
(74) *Attorney, Agent, or Firm* — BCF LLP

(57) ABSTRACT

A method of operating a self-driving vehicle is provided. The method includes predicting a trajectory of an agent in a vicinity of the self-driving vehicle. This is done by: receiving sensor data indicative of a current situation in the vicinity of the self-driving vehicle; generating a current situation feature vector based, at least in part, on the sensor data; searching a pre-built bank of library feature vectors to identify a result feature vector from the pre-built bank that is most relevant to the current situation feature vector, wherein each library feature vector in the pre-built bank is associated with an observed trajectory; and predicting the trajectory of the agent based, at least in part, on the result feature vector. The method also includes planning an action of the vehicle based, at least in part, on the predicted agent trajectory, and operating the vehicle according to the planned action.

18 Claims, 5 Drawing Sheets

(56) References Cited

U.S. PATENT DOCUMENTS

| | | | | |
|---|---|---|---|---|
| 10,915,524 | B1* | 2/2021 | Gupta | G06F 16/27 |
| 2017/0228507 | A1* | 8/2017 | Bottinger | G16B 40/00 |
| 2018/0374359 | A1 | 12/2018 | Li et al. | |
| 2019/0102630 | A1* | 4/2019 | Bamba | G06T 11/206 |
| 2019/0179858 | A1* | 6/2019 | Douze | G06F 16/2365 |
| 2020/0346093 | A1* | 11/2020 | Ono | G06V 20/42 |
| 2020/0361483 | A1* | 11/2020 | Yonushonis | B60W 30/0953 |
| 2020/0379461 | A1* | 12/2020 | Singh | G06N 3/044 |
| 2021/0146963 | A1* | 5/2021 | Li | G06N 20/00 |
| 2021/0150350 | A1 | 5/2021 | Gao et al. | |

OTHER PUBLICATIONS

Russian Search Report dated May 23, 2023 issued in respect of the counterpart Russian Patent Application No. RU 2021115369.

Biktairov et al.,"PRANK: motion Prediction based on RANKing", Published on Oct. 22, 2020, https://arxiv.org/abs/2010.12007v1.

Malkov et al.,"Efficient and Robust Approximate Nearest Neighbor Search Using Hierarchical Navigable Small World Graphs", IEEE Transactions on Pattern Analysis and Machine Intelligence, vol. 42, Issue: 4, Apr. 1, 2020, Date of publication Dec. 28, 2018, pp. 824-836.

Rudenko et al.,"Human MotionTrajectory Prediction: A Survey", Published on May 15, 2019, arXiv:1905.06113v2 [cs.RO].

European Search Report dated Jul. 4, 2022 issued in respect of the European Patent Application No. 22154048.7.

\* cited by examiner

METHOD FOR PREDICTING A TRAJECTORY OF AN AGENT IN A VICINITY OF A SELF-DRIVING VEHICLE BASED ON RANKING

CROSS-REFERENCE

The present application claims priority to Russian Patent Application No. 2021115369, entitled "Method for Predicting a Trajectory of an Agent in a Vicinity of a Self-Driving Vehicle Based on Ranking", filed May 28, 2021, the entirety of which is incorporated herein by reference.

FIELD OF TECHNOLOGY

The present technology relates to computer-implemented methods and systems for operating a self-driving vehicle, and more specifically, to methods and systems for predicting a trajectory of an agent, such as a pedestrian or human-driven vehicle, in the vicinity of a self-driving vehicle.

BACKGROUND

Self-driving vehicles are vehicles that are able to autonomously drive themselves through private and/or public spaces. Using a system of sensors that detect the location and/or surroundings of the vehicle, logic within or associated with the vehicle controls the speed, propulsion, braking, and steering of the vehicle based on the sensor-detected location and surroundings of the self-driving vehicle.

A variety of sensor systems may be used by the self-driving vehicle, such as but not limited to camera systems, radar systems, and LIDAR systems. Different sensor systems may be employed for capturing different information, and/or in different format, about the location and the surroundings of the self-driving vehicle. For example, camera systems may be used for capturing image data about the surroundings of the self-driving vehicle. In another example, LIDAR systems may be used to capture point cloud data for building 3D map representations of the surroundings and other potential objects located in proximity to the self-driving vehicle.

One problem associated with operating a self-driving vehicle is correctly predicting the motion of agents, such as pedestrians or human-driven vehicles. The overall safety of driving and the comfort of a passenger may depend directly on the ability to accurately make such predictions. If these predictions are incorrect, it is possible that rapid maneuvers or even a collision could result.

The motion prediction problem also remains one of the most challenging problems in autonomous driving engineering, mainly due to high variance of the possible agent's future behavior given a current situation at the time of the prediction. The two phenomena responsible for the variance are the multimodality caused by the uncertainty of the agent's intent (e.g., turn right or move forward) and uncertainty in the realization of a given intent (e.g., which lane to turn into).

To be useful within a real-time autonomous driving pipeline, a motion prediction system must provide efficient ways to describe and quantify this uncertainty, such as computing the most likely trajectories for an agent and their probabilities or estimating the relative likelihood of a given trajectory. It also should not put substantial emphasis on physically impossible trajectories, as they can, in a sense, confuse the system processing the predictions.

SUMMARY

Implementations of the disclosed technology predict the motion of agents, such as pedestrians and vehicles driven by humans, in the vicinity a self-driving vehicle. Such predictions should be made with low latency and should avoid predicting implausible agent trajectories. In accordance with various implementations of the disclosed technology, this is achieved by using a pre-built trajectory bank, containing feature vectors that are associated with previously observed agent trajectories. A self-driving vehicle collects sensor data indicative of a current situation in the vicinity of the self-driving vehicle. This sensor data is used to generate scene data that is mapped to a feature vector indicative of the current situation. The pre-built trajectory bank is then searched for feature vectors that are relevant to (e.g., by being spatially close to) the feature vector representing the current situation, and a trajectory associated with a relevant feature vector from the trajectory bank is used to predict the trajectory of the agent.

Because the predicted trajectory is selected from a pre-built trajectory bank of actual observed agent trajectories, the predicted trajectory will be physically plausible. Additionally, by effectively transforming the agent trajectory prediction problem into a kind of search problem, the computational complexity of predicting the agent trajectory is greatly reduced in comparison to attempting to generate a prediction from scratch. This may result in reduced latency in predicting the trajectory of agents. Accordingly, implementations of the disclosed technology improve the operation of self-driving vehicles.

In accordance with one aspect of the present disclosure, the technology is implemented in a method of operating a self-driving vehicle. The method includes predicting, by a computing device associated with the self-driving vehicle, a trajectory of an agent in a vicinity of the self-driving vehicle. This is done by: receiving sensor data indicative of a current situation in the vicinity of the self-driving vehicle from a sensor associated with the self-driving vehicle; generating a current situation feature vector based, at least in part, on the sensor data; searching a pre-built bank of library feature vectors to identify a result feature vector from the pre-built bank that is most relevant to the current situation feature vector, wherein each library feature vector in the pre-built bank is associated with an observed trajectory; and predicting the trajectory of the agent based, at least in part, on the result feature vector. The method also includes planning, by the computing device, an action of the self-driving vehicle based, at least in part, on the predicted trajectory of the agent, and operating the self-driving vehicle according to the planned action.

In some implementations, generating the current situation feature vector includes using a pre-trained neural network to generate the current situation feature vector. In some of these implementations, using the pre-trained neural network includes providing a feature map representing aspects of a birds-eye view of the current situation in the vicinity of the self-driving vehicle, based, at least in part, on the sensor data as input to the pre-trained neural network. In some implementations, the feature map is centered on the agent, and has an orientation based on an orientation of the agent.

In some implementations, searching the pre-built bank of library feature vectors includes performing an approximate nearest neighbor search. In some of these implementations, the pre-built bank of library feature vectors includes an index based on a hierarchical navigable small world graph, and performing the approximate nearest neighbor search includes traversing the hierarchical navigable small world graph.

In some implementations, searching the pre-built bank of library feature vectors includes generating a ranked list of feature vectors from the pre-built bank. In some of these implementations, generating the ranked list of feature vectors includes ranking the library feature vectors based, at least in part, on a measure of relevance of the library feature vectors to the current situation feature vector.

In some implementations, the result feature vector includes the library feature vector that is closest to the current situation feature vector.

In accordance with other aspects of the present disclosure, a method of generating a bank of library feature vectors for use in predicting a trajectory of an agent in the vicinity of an in-use self-driving vehicle is provided. The method includes: receiving, on a server, a plurality of observation samples, each observation sample collected by a sensor on a data collection self-driving vehicle, each observation sample including data on a trajectory of an observed agent in the vicinity of the data collection self-driving vehicle over a predetermined period of time; sampling, on the server, at least a first portion of the plurality of observation samples, to obtain a library of agent trajectories; generating, on the server, a library feature vector for each trajectory in the library of agent trajectories; assembling, on the server, the bank of library feature vectors based, at least in part, on the library feature vectors; and sending the bank of library feature vectors to a computing device associated with the in-use self-driving vehicle.

In some implementations of this aspect, sampling, on the server, at least the first portion of the plurality of observation samples, to obtain the library of agent trajectories includes clustering agent trajectories from at least the first portion of the plurality of observation samples into a plurality of clusters, each cluster in the plurality of clusters containing similar agent trajectories. A cluster from the plurality of clusters is randomly selected, and an agent trajectory is randomly selected from the selected cluster.

In some implementations, assembling, on the server, the bank of library feature vectors further includes generating an index of library feature vectors in the bank of library feature vectors. In some of these implementations, generating the index of library feature vectors includes generating a proximity graph of the library feature vectors. In some implementations, the proximity graph includes a hierarchical navigable small world graph.

In some implementations, generating, on the server, the library feature vector for each trajectory in the library of agent trajectories includes using a neural network to generate the library feature vector from each trajectory in the library of agent trajectories.

In some implementations, each observation sample further includes data on a scene surrounding the observed agent. Additionally, the method further includes: using at least a second portion of the plurality of observation samples for training a first neural network to generate first feature vectors based on input of the scenes surrounding the observed agents; and using at least the second portion of the plurality of observation samples for jointly training a second neural network to generate second feature vectors based on input of the trajectories of the observed agents. The first feature vectors and second feature vectors will be close when the trajectory of an observed agent corresponds to the scene surrounding that observed agent.

In accordance with a further aspect of the present disclosure, the technology is implemented in a server. The server includes a processor and a memory coupled to the processor. the memory comprising programmed instructions that when executed by the processor cause the processor to: access, on the server, a plurality of observation samples, each observation sample collected by a sensor on a data collection self-driving vehicle, each observation sample including data on a trajectory of an observed agent in a vicinity of the data collection self-driving vehicle over a predetermined period of time; sample, on the server, at least a first portion of the plurality of observation samples, to obtain a library of agent trajectories; generate, on the server, a library feature vector for each trajectory in the library of agent trajectories; assemble, on the server, a bank of library feature vectors based, at least in part, on the library feature vectors; and provide the bank of library feature vectors to a computing device associated with a self-driving vehicle.

In some implementations, the memory includes programmed instructions that when executed by the processor cause the processor to sample, on the server, at least the first portion of the plurality of observation samples, to obtain the library of agent trajectories by: clustering agent trajectories from at least the first portion of the plurality of observation samples into a plurality of clusters, each cluster in the plurality of clusters containing similar agent trajectories; randomly selecting a cluster from the plurality of clusters; and randomly selecting an agent trajectory from the selected cluster.

In accordance with yet another aspect of the present disclosure, the technology is implemented in a self-driving vehicle. The self-driving vehicle includes at least one sensor. The self-driving vehicle further includes a computing device including a processor and a memory. The memory stores programmed instructions that when executed by the processor cause the computing device to predict a trajectory of an agent in a vicinity of the self-driving vehicle by: receiving sensor data indicative of a current situation in the vicinity of the self-driving vehicle from the at least one sensor; generating a current situation feature vector based, at least in part, on the sensor data; searching a pre-built bank of library feature vectors to identify a result feature vector from the pre-built bank that is most relevant to the current situation feature vector, wherein each library feature vector in the pre-built bank is associated with an observed trajectory; and predicting the trajectory of the agent based, at least in part, on the result feature vector. The memory further stores programmed instructions that when executed by the processor cause the computing device to plan an action of the self-driving vehicle based, at least in part, on the predicted trajectory of the agent, and operate the self-driving vehicle according to the planned action. In some implementations, the self-driving vehicle is a self-driving car.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
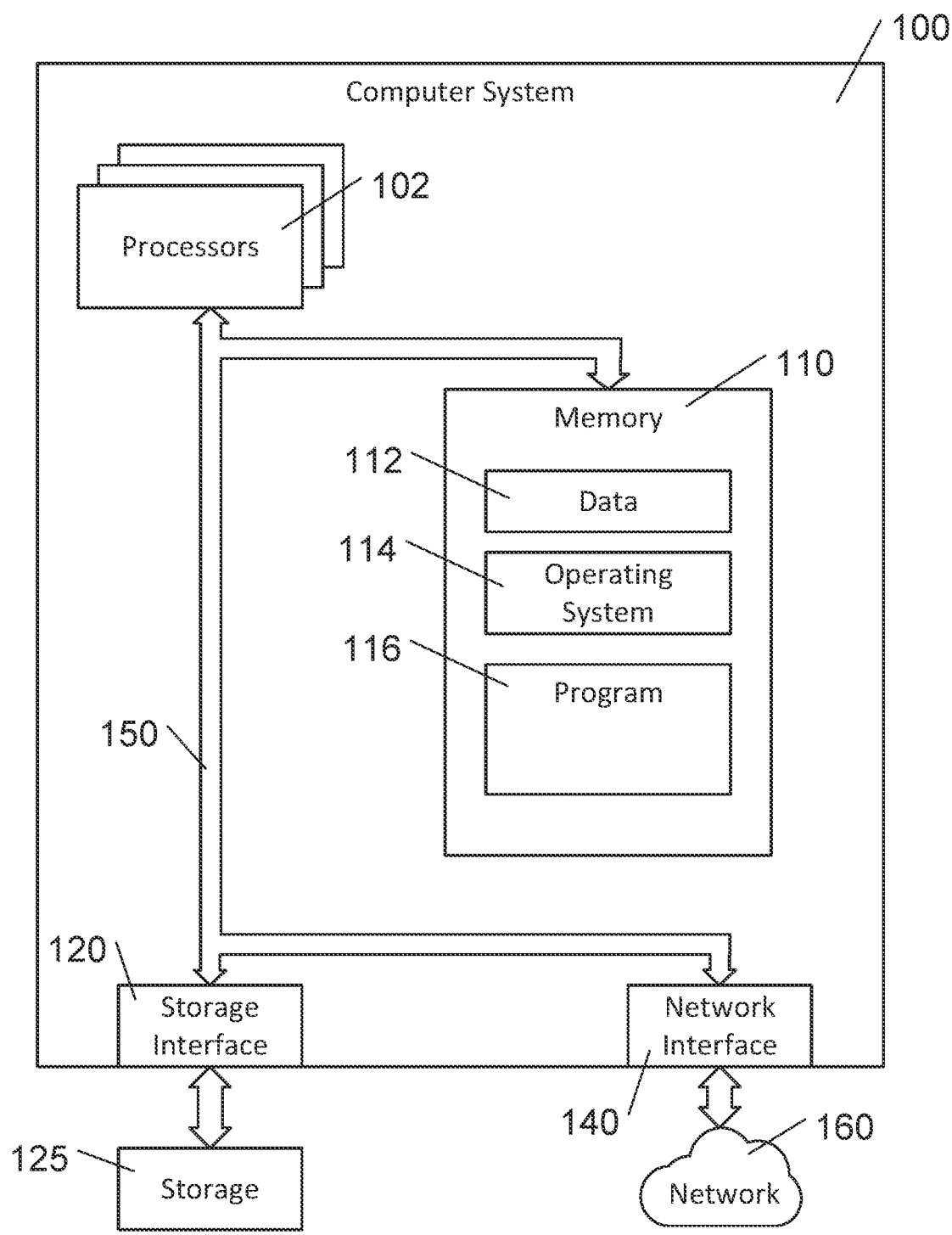
FIG. 1 depicts a schematic diagram of an example computer system for use in some implementations of systems and/or methods of the present technology.

Various representative implementations of the disclosed technology will be described more fully hereinafter with reference to the accompanying drawings. The present technology may, however, be implemented in many different forms and should not be construed as limited to the representative implementations set forth herein. In the drawings, the sizes and relative sizes of layers and regions may be exaggerated for clarity. Like numerals refer to like elements throughout.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. By contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative implementations and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The functions of the various elements shown in the figures, including any functional block labeled as a "processor," may be provided through the use of dedicated hardware as well as hardware capable of executing software. When provided by a processor, the functions may be provided by a single dedicated processor, by a single shared processor, or by a plurality of individual processors, some of which may be shared. In some implementations of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, an application-specific integrated circuit (ASIC), a field-programmable gate array (FPGA), a read-only memory (ROM) for storing software, a random-access memory (RAM), and non-volatile storage. Other hardware, conventional and/or custom, may also be included.

Software modules, or simply modules or units which are implied to be software, may be represented herein as any combination of flowchart elements or other elements indicating the performance of process steps and/or textual description. Such modules may be executed by hardware that is expressly or implicitly shown. Moreover, it should be understood that a module may include, for example, but without limitation, computer program logic, computer program instructions, software, stack, firmware, hardware circuitry, or a combination thereof, which provides the required capabilities.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

The present technology may be implemented as a system, a method, and/or a computer program product. The computer program product may include a computer-readable storage medium (or media) storing computer-readable program instructions that, when executed by a processor, cause the processor to carry out aspects of the disclosed technology. The computer-readable storage medium may be, for example, an electronic storage device, a magnetic storage device, an optical storage device, an electromagnetic storage device, a semiconductor storage device, or any suitable combination of these. A non-exhaustive list of more specific examples of the computer-readable storage medium includes: a portable computer disk, a hard disk, a random-access memory (RAM), a read-only memory (ROM), a flash memory, an optical disk, a memory stick, a floppy disk, a mechanically or visually encoded medium (e.g., a punch card or bar code), and/or any combination of these. A computer-readable storage medium, as used herein, is to be construed as being a non-transitory computer-readable medium. It is not to be construed as being a transitory signal, such as radio waves or other freely propagating electromagnetic waves, electromagnetic waves propagating through a waveguide or other transmission media (e.g., light pulses passing through a fiber-optic cable), or electrical signals transmitted through a wire.

It will be understood that computer-readable program instructions can be downloaded to respective computing or processing devices from a computer-readable storage medium or to an external computer or external storage device via a network, for example, the Internet, a local area network, a wide area network and/or a wireless network. A network interface in a computing/processing device may receive computer-readable program instructions via the network and forward the computer-readable program instructions for storage in a computer-readable storage medium within the respective computing or processing device.

Computer-readable program instructions for carrying out operations of the present disclosure may be assembler instructions, machine instructions, firmware instructions, configuration data for integrated circuitry, or either source code or object code written in any combination of one or more programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network.

All statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable program instructions. These computer-readable program instructions may be provided to a processor or other programmable data processing apparatus to generate a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowcharts, flow diagrams, state transition diagrams, pseudo-code, and the like.

The computer-readable program instructions may also be loaded onto a computer, other programmable data processing apparatus or other devices to cause a series of operational steps to be performed on the computer, other programmable apparatus or other devices to generate a computer-implemented process, such that the instructions which execute on the computer, other programmable apparatus, or other device implement the functions/acts specified in the flowcharts, flow diagrams, state transition diagrams, pseudo-code, and the like.

In some alternative implementations, the functions noted in flowcharts, flow diagrams, state transition diagrams, pseudo-code, and the like may occur out of the order noted in the figures. For example, two blocks shown in succession in a flowchart may, in fact, be executed substantially concurrently, or the blocks may sometimes be executed in the reverse order, depending upon the functionality involved. It will also be noted that each of the functions noted in the figures, and combinations of such functions can be implemented by special-purpose hardware-based systems that perform the specified functions or acts or by combinations of special-purpose hardware and computer instructions.

With these fundamentals in place, we will now consider some non-limiting examples to illustrate various implementations of aspects of the present disclosure.

Computer System

FIG. 1 shows a computer system 100. The computer system 100 may be a multi-user computer, a single user computer, a laptop computer, a tablet computer, a smartphone, an embedded control system, or any other computer system currently known or later developed. Additionally, it will be recognized that some or all the components of the computer system 100 may be virtualized and/or cloud-based. As shown in FIG. 1, the computer system 100 includes one or more processors 102, a memory 110, a storage interface 120, and a network interface 140. These system components are interconnected via a bus 150, which may include one or more internal and/or external buses (not shown) (e.g. a PCI bus, universal serial bus, IEEE 1394 "Firewire" bus, SCSI bus, Serial-ATA bus, etc.), to which the various hardware components are electronically coupled.

The memory 110, which may be a random-access memory or any other type of memory, may contain data 112, an operating system 114, and a program 116. The data 112 may be any data that serves as input to or output from any program in the computer system 100. The operating system 114 is an operating system such as MICROSOFT WINDOWS or LINUX. The program 116 may be any program or set of programs that include programmed instructions that may be executed by the processor to control actions taken by the computer system 100.

The storage interface 120 is used to connect storage devices, such as the storage device 125, to the computer system 100. One type of storage device 125 is a solid-state drive, which may use an integrated circuit assembly to store data persistently. A different kind of storage device 125 is a hard drive, such as an electro-mechanical device that uses magnetic storage to store and retrieve digital data. Similarly, the storage device 125 may be an optical drive, a card reader that receives a removable memory card, such as an SD card, or a flash memory device that may be connected to the computer system 100 through, e.g., a universal serial bus (USB).

In some implementations, the computer system 100 may use well-known virtual memory techniques that allow the programs of the computer system 100 to behave as if they have access to a large, contiguous address space instead of access to multiple, smaller storage spaces, such as the memory 110 and the storage device 125. Therefore, while the data 112, the operating system 114, and the programs 116 are shown to reside in the memory 110, those skilled in the art will recognize that these items are not necessarily wholly contained in the memory 110 at the same time.

The processors 102 may include one or more microprocessors and/or other integrated circuits. The processors 102 execute program instructions stored in the memory 110. When the computer system 100 starts up, the processors 102 may initially execute a boot routine and/or the program instructions that make up the operating system 114.

The network interface 140 is used to connect the computer system 100 to other computer systems or networked devices (not shown) via a network 160. The network interface 140 may include a combination of hardware and software that allows communicating on the network 160. In some implementations, the network interface 140 may be a wireless network interface. The software in the network interface 140 may include software that uses one or more network protocols to communicate over the network 160. For example, the network protocols may include TCP/IP (Transmission Control Protocol/Internet Protocol).

It will be understood that the computer system 100 is merely an example and that the disclosed technology may be used with computer systems or other computing devices having different configurations.

Networked Computing Environment

Figure 2:
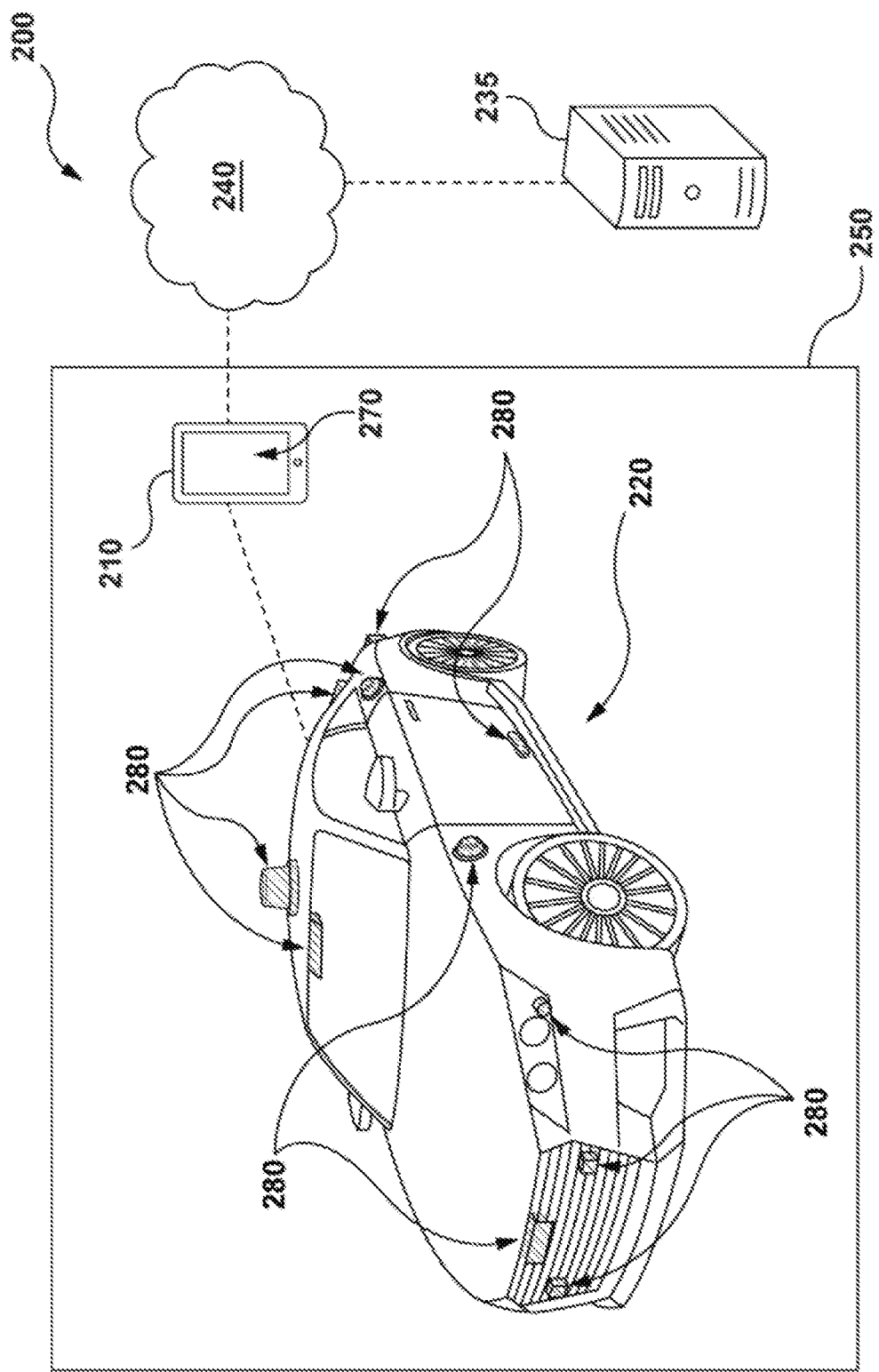
FIG. 2 depicts a networked computing environment including a self-driving vehicle, suitable for use with some implementations of the present technology.

FIG. 2 shows a networked computing environment 200 suitable for use with some non-limiting implementations of the present technology. The networked computing environment 200 includes a computing device 210 associated with a vehicle 220 and/or associated with a user (not depicted) who is associated with the vehicle 220 (such as an operator of the vehicle 220). The networked computing environment 200 also includes a server 235 in communication with the computing device 210 via a communication network 240 (e.g. the Internet or the like).

In at least some non-limiting implementations of the present technology, the computing device 210 is communicatively coupled to control systems of the vehicle 220. The computing device 210 could be arranged and configured to control different operations systems of the vehicle 220, including but not limited to: an ECU (engine control unit), steering systems, braking systems, and signaling and illumination systems (i.e. headlights, brake lights, and/or turn signals). In such an implementation, the vehicle 220 could be a self-driving vehicle.

In some non-limiting implementations of the present technology, the networked computing environment 200 could include a GPS satellite (not depicted) transmitting and/or receiving a GPS signal to/from the computing device 210. It will be understood that the present technology is not limited to GPS and may employ a positioning technology other than GPS. It should be noted that the GPS satellite can be omitted altogether.

The vehicle 220, to which the computing device 210 is associated, could be any transportation vehicle, for leisure or otherwise, such as a private or commercial car, truck, motorbike or the like. Although the vehicle 220 is depicted as being a land vehicle, this may not be the case in each and every non-limiting implementation of the present technology. For example, in certain non-limiting implementations of the present technology, the vehicle 220 may be a watercraft, such as a boat, or an aircraft, such as a flying drone.

The vehicle 220 may be user operated or a driver-less vehicle. In some non-limiting implementations of the present technology, it is contemplated that the vehicle 220 could be implemented as a self-driving car (SDC). The vehicle 220 may be a fully self-driving vehicle, or a partially autonomous vehicle, in which a human driver controls some aspects of the vehicle's operation, while other aspects (e.g., "autopilot" on highways) are automated. It should be noted that specific parameters of the vehicle 220 are not limiting, these specific parameters including for example: vehicle manufacturer, vehicle model, vehicle year of manufacture, vehicle weight, vehicle dimensions, vehicle weight distribution, vehicle surface area, vehicle height, drive train type (e.g. 2x or 4x), tire type, brake system, fuel system, mileage, vehicle identification number, engine size, or other characteristics or parameters of a vehicle.

According to the present technology, the implementation of the computing device 210 is not particularly limited. For example, the computing device 210 could be implemented as a vehicle engine control unit, a vehicle CPU, a vehicle navigation device (e.g. TomTom™, Garmin™), a tablet, a personal computer built into the vehicle 220, and the like. Thus, it should be noted that the computing device 210 may or may not be permanently associated with the vehicle 220. Additionally or alternatively, the computing device 210 could be implemented in a wireless communication device such as a mobile telephone (e.g. a smartphone or a radiophone). In certain implementations, the computing device 210 has a display 270.

The computing device 210 could include some or all of the components of the computer system 100 depicted in FIG. 1, depending on the particular implementation. In certain implementations, the computing device 210 is an on-board computer device and includes the processors 102, the storage device 125 and the memory 110. In other words, the computing device 210 includes hardware and/or software and/or firmware, or a combination thereof, for processing data as will be described in greater detail below.

In some non-limiting implementations of the present technology, the communication network 240 is the Internet. In alternative non-limiting implementations of the present technology, the communication network 240 can be implemented as any suitable local area network (LAN), wide area network (WAN), a private communication network or the like. It should be expressly understood that implementations for the communication network 240 are for illustration purposes only. A communication link (not separately numbered) is provided between the computing device 210 and the communication network 240, the implementation of which will depend, inter alia, on how the computing device 210 is implemented. Merely as an example and not as a limitation, in those non-limiting implementations of the present technology where the computing device 210 is implemented as a wireless communication device such as a smartphone or a navigation device, the communication link can be implemented as a wireless communication link. Examples of wireless communication links may include, but are not limited to, a 3G communication network link, a 4G communication network link, and the like. The communication network 240 may also use a wireless connection with the server 235.

In some implementations of the present technology, the server 235 is implemented as a computer server and could include some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting implementations of the present technology, the server 235 is a single server. In alternative non-limiting implementations of the present technology, the functionality of the server 235 may be distributed and may be implemented via multiple servers (not shown).

In some non-limiting implementations of the present technology, the processors 102 of the computing device 210 could be in communication with the server 235 to receive one or more updates. Such updates could include, but are not limited to, software updates, map updates, routes updates, weather updates, and the like. In some non-limiting implementations of the present technology, the computing device 210 can also be configured to transmit to the server 235 certain operational data, such as routes traveled, traffic data, performance data, and the like. Some or all such data transmitted between the vehicle 220 and the server 235 may be encrypted and/or anonymized.

It should be noted that a variety of sensors and systems may be used by the computing device 210 for gathering information about surroundings 250 of the vehicle 220. As seen in FIG. 2, the vehicle 220 may be equipped with a plurality of sensor systems 280. It should be noted that different sensor systems from the plurality of sensor systems 280 may be used for gathering different types of data regarding the surroundings 250 of the vehicle 220.

In one example, the plurality of sensor systems 280 may include various optical systems including, inter alfa, one or more camera-type sensor systems that are mounted to the vehicle 220 and communicatively coupled to the processors 102 of the computing device 210. Broadly speaking, the one or more camera-type sensor systems may be configured to gather image data about various portions of the surroundings 250 of the vehicle 220. In some cases, the image data provided by the one or more camera-type sensor systems could be used by the computing device 210 for performing object detection procedures. For example, the computing device 210 could be configured to feed the image data provided by the one or more camera-type sensor systems to an Object Detection Neural Network (ODNN) that has been trained to localize and classify potential objects in the surroundings 250 of the vehicle 220.

In another example, the plurality of sensor systems 280 could include one or more radar-type sensor systems that are mounted to the vehicle 220 and communicatively coupled to the processors 102. Broadly speaking, the one or more radar-type sensor systems may be configured to make use of radio waves to gather data about various portions of the surroundings 250 of the vehicle 220. For example, the one or more radar-type sensor systems may be configured to gather radar data about potential objects in the surroundings 250 of the vehicle 220, such data potentially being representative of a distance of objects from the radar-type sensor system, orientation of objects, velocity and/or speed of objects, and the like.

In a further example, the plurality of sensor systems 280 could include one or more LIDAR systems that are mounted to the vehicle 220 and communicatively coupled to the processors 102. Broadly speaking, a LIDAR system is configured to capture data about the surroundings 250 of the vehicle 220 used, for example, for building a multi-dimensional map of objects in the surroundings 250 of the vehicle 220. The LIDAR system could be mounted, or retrofitted, to the vehicle 220 in a variety of locations and/or in a variety of configurations for gathering information about surroundings 250 of the vehicle 220.

For example, depending on the implementation of the vehicle 220 and the LIDAR system, the LIDAR system could be mounted on an interior, upper portion of a windshield of the vehicle 220. Nevertheless, other locations for mounting the lidar system are within the scope of the present disclosure, including on a back window, side windows, front hood, rooftop, front grill, front bumper or the side of the vehicle 220.

In the context of the present technology, the computing device 210 is configured to detect one or more objects in the surroundings 250 of the vehicle 220 based on data acquired from one or more camera systems and from one or more LIDAR systems. For example, the computing device 210 configured to detect a given object in the surroundings 250 of the vehicle 220 may be configured to identify LIDAR data and camera data associated with the given object, generate an "embedding" representative of features associated with the given object, and detect the object by generating a bounding box for the object.

Agent Trajectory Prediction

Implementations of the disclosed technology predict the motion of agents (i.e. other road scene participants) surrounding a self-driving vehicle, such as pedestrians and vehicles driven by humans. As is the case for any vehicle, a self-driving vehicle needs time to change its speed. Sudden changes in speed and acceleration occasioned by incorrectly predicting the trajectory of an agent may be uncomfortable for passengers of the self-driving vehicle. In some cases, incorrect predictions of the motion of agents could even lead to collisions. The motion planning module of a self-driving vehicle thus needs to have a good idea of where nearby agents might be in a few seconds, so that it can plan for the self-driving vehicle to maintain a safe distance. The motion planning module can also greatly benefit from understanding when the situation is inherently multimodal, and multiple distinct futures are likely. In such situations a self-driving vehicle might maintain extra caution until the situation becomes clearer.

In accordance with various implementations of the disclosed technology, one way to describe an agent's future motion is to represent it as the likelihoods of the agent's possible future trajectories (e.g., as a probability distribution over the possible trajectories), based on the information about the scene available at the time the prediction was made.

For practical use in a self-driving vehicle, these likelihoods should be computed with low latency, so predictions can quickly be changed based on new information such as a sudden change in the agent's acceleration, and the planning subsystem of the self-driving vehicle can be promptly informed about the situation change. Additionally, there should be efficient access to the expected and most likely future agent positions, so the planning subsystem can use this information in real-time. Further, there should be a convenient way to quantify future uncertainty and possible multimodality.

The non-limiting embodiments of the present technology are directed to making predictions of an agent's future trajectory by ranking possible future trajectories based on a metric representing a likelihood that the agent will follow each of a predetermined set of possible future trajectories. Various implementations of the disclosed technology take a discriminative approach, using metric-based machine learning methods coupled with approximate nearest neighbor search methods to make predictions. In accordance with various implementations, trajectory predictions are selected by scoring a dictionary (also referred to as a "library" or "bank") of trajectories prepared in advance, such as a representative subset of agent trajectories observed in real life by a perception system of a self-driving vehicle. The trajectory bank may be preprocessed offline. This means that during operation of the self-driving vehicle, the amount and complexity of the computations for making a prediction of an agent's future trajectory are substantially reduced. In operation, the self-driving vehicle encodes a scene surrounding the self-driving vehicle or the agent, and makes the prediction using approximate nearest neighbor search methods on the trajectory bank. Additionally, in some implementations, Monte-Carlo estimation techniques may be used in making the prediction.

Figure 3:
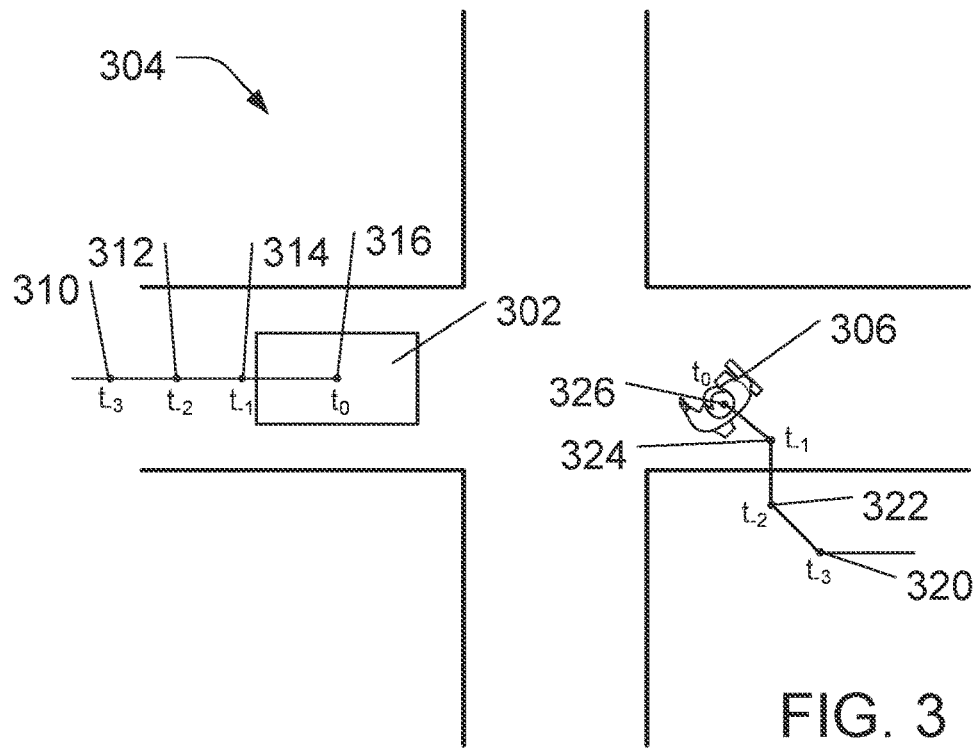
FIG. 3 shows an overview of a scenario in which various implementations of the disclosed technology may be used.
Figure 4:
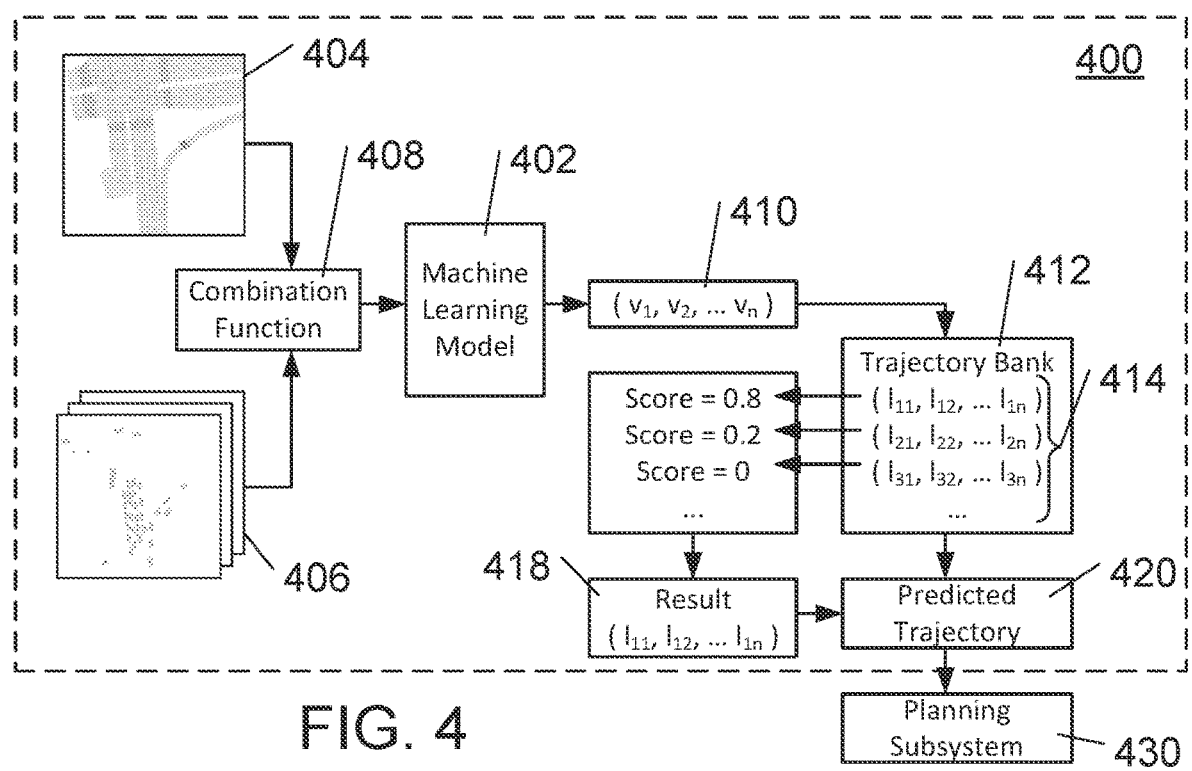
FIG. 4 is a block diagram depicting an example scenario of agent trajectory prediction in accordance with various implementations of the disclosed technology.

FIGS. 3 and 4 show an overview of a scenario in which various implementations of the disclosed technology may be used. In the example shown in FIG. 3, a self-driving vehicle 302 (in this case, a self-driving car) is moving in a scene 304. An agent 306 (in this case, a pedestrian) is also moving in the scene 304. The self-driving vehicle 302 uses the various sensors (e.g., LIDAR, RADAR, cameras, etc.—not shown) to collect information about the scene, and uses well-known techniques, such as machine vision object recognition algorithms, to process the sensor inputs to form a set of scene feature maps representing various aspects of the scene. In some implementations, these feature maps may represent features of the scene as overhead or "bird's eye" views. In some implementations, these feature maps share the same reference frame. For example, the feature maps may be generated such that the agent of interest is located in the center of the map at the prediction time, and the Y-axis of the map is aligned with the agent's orientation. Each of these feature maps represents some aspect of the scene, such as a lane or crosswalk location, agent presence, speed, or acceleration at a particular time, lane availability induced by traffic light states, and/or other aspects that can be detected using the sensors on the self-driving vehicle 302.

Feature maps for aspects that change over time are generated over a predetermined period of time. For example, the scene 304 may be sampled over a few seconds (e.g., three seconds) at a fixed sampling frequency (e.g., two samples per second). The positions 310, 312, 314, and 316 are shown in FIG. 3 for the self-driving vehicle 302 at times $t_{-3}$, $t_{-2}$, $t_{-1}$, $t_0$, respectively. The positions 320, 322, 324, and 326 are shown for the agent 306 at times $t_{-3}$, $t_{-2}$, $t_{-1}$, $t_0$, respectively. A combination of a static feature map and these time-dependent feature maps may be used to represent a current situation of the self-driving vehicle.

As shown in FIG. 4, based on the collected information, a computing device (not shown) associated with the self-driving vehicle will attempt to predict the future trajectory of the agent over the next several seconds in an agent trajectory prediction module 400. To make this prediction, a static scene feature map 404 may be combined with time-dependent scene feature maps 406, using a combination function 408. In some implementations, the combination function 408 may concatenate the static scene feature map 404 and the time-dependent scene feature maps 406, though it will be understood that other combination functions may be used. The combination of the scene feature maps produced by the combination function 408 is then used as an input to a trained machine learning model 402, such as a pre-trained artificial neural network, which generates a feature vector 410, representing a current situation in the vicinity of the self-driving vehicle.

The feature vector 410 is then used to search a pre-built bank 412 of library feature vectors 414, in which each of the library feature vectors represents a possible trajectory for the agent. In some implementation, this search may take the form of computing a relevance of a set of the library feature vectors (which could include all of the library feature vectors) to the feature vector 410. In some implementations this search may be done using an approximate K-nearest neighbor search, which may use, for example, a pre-built hierarchical navigable small world graph, such as is described in Y. A. Malkov and D. A. Yashunin, "Efficient and robust approximate nearest neighbor search using hierarchical navigable small world graphs," *IEEE Transactions on Pattern Analysis and Machine Intelligence*, vol. 42, no. 4, pp. 824-836, 1 Apr. 2020. It will, of course, be understood that other known or later developed K-nearest neighbor search algorithms or methods could be used, or the search could be performed using another known or later developed search algorithm.

This search of the feature vector 410 in the pre-built bank 412 produces a set of relevance scores 416 for the set of library feature vectors. These relevance scores may, for example, be based on a spatial distance (e.g., a Euclidean distance) of the library feature vectors from the feature vector 410, or on other relevance measures. These relevance measures may, in some implementations, represent the likelihood of the agent following the future trajectory corresponding to a library feature vector. Once these relevance scores are computed, the most relevant library feature vector may be selected as the "result" feature vector 418, and a predicted agent trajectory 420 may be based on an agent trajectory corresponding to the result feature vector 418. In some implementations, the set of library feature vectors may be ranked according to their relevance scores, and this ranking may be used to select a result feature vector 418 to be used for a prediction of the agent trajectory. In some implementations, in which the relevance score represents a likelihood of the agent following the trajectory corresponding to a library feature vector, Monte-Carlo methods may be used to select a result feature vector 418 to be used for a prediction of the agent trajectory.

Once the result feature vector 418 is selected, the prediction of the agent's trajectory may be based on an agent trajectory from the trajectory bank that corresponds to the result feature vector 418. In some implementations, the result feature vector 418 may be based on more than one of the library feature vectors, and the predicted agent trajectory 420 may be based on more than one agent trajectory from the trajectory bank. In some implementations, the prediction method described above may be repeated for each agent of interest that is detected in the scene. In some implementations, multimodality can be handled by extending the machine learning model to generate multimodal output in the form of multiple feature vectors and weights, and then matching the feature vectors on a per-mode basis, with the results possibly being aggregated across modes.

Once a predicted agent trajectory 420 is prepared, the predicted agent trajectory 420 may be sent to a planning subsystem 430 associated with the self-driving vehicle. The planning subsystem will take the predicted trajectory for the agent into account when planning actions of the self-driving vehicle, and the self-driving vehicle will be operated according to these actions.

Figure 5:
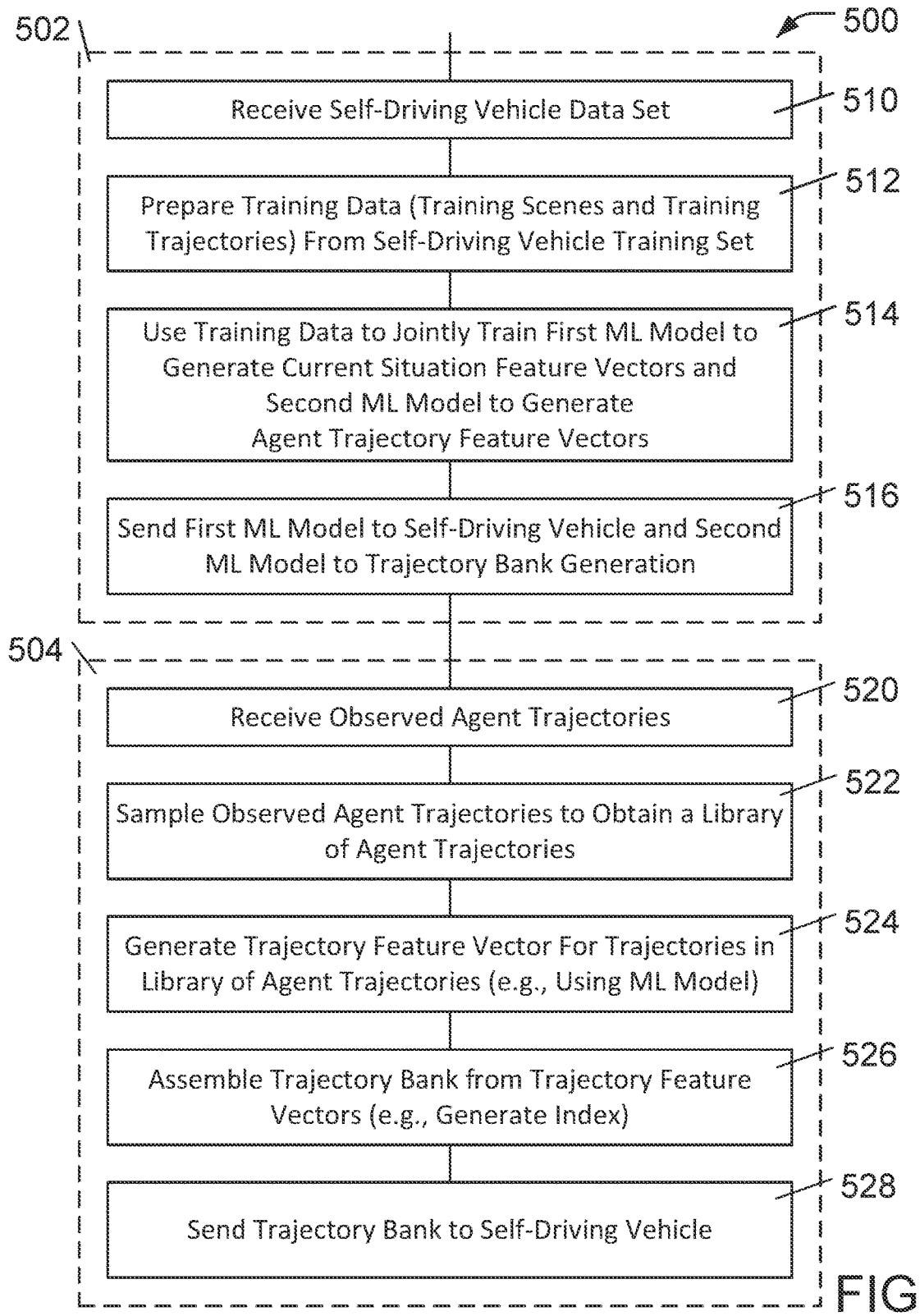
FIG. 5 shows a flowchart of a method for generating the trajectory bank and the machine learning model used in the agent trajectory prediction method in accordance with various implementations of the disclosed technology.

As will be understood from the above disclosure referring to FIGS. 3 and 4, predicting the trajectory of an agent uses a pre-trained machine learning model, such as a pre-trained neural network to generate feature vectors representing the current situation based on feature maps. Additionally, a pre-built trajectory bank is searched for library feature vectors that are relevant to these current situation feature vectors, where the library feature vectors are associated with possible trajectories for the agent. Thus, in accordance with various implementations of the disclosed technology an offline method for generating the trajectory bank and the machine learning model are used. A flowchart of such a method is described with reference to FIG. 5.

The method 500 is divided into two main sections: a machine learning model training section 502; and a trajectory bank generation section 504. The machine learning model training section 502 jointly trains two machine learning models, such as artificial neural networks, including a first machine learning model that generates current situation feature vectors based on feature maps, and a second machine learning model that generates feature vectors in the same feature space as the feature vectors generated by the first machine learning model, based on observed agent trajectories. The first machine learning model is used during operation of a self-driving vehicle, as discussed above. The second machine learning model is used offline, during generation of the trajectory bank. In some implementations, both the first and second machine learning models may be convolutional neural networks (CNNs).

At block 510 of the machine learning model training section 502, a self-driving vehicle data set is received or accessed from a database. The self-driving vehicle data set will generally include a large amount of data collected by numerous self-driving vehicles over a number of months, or even years. In some implementations, the data set includes observation samples having recorded sensor readings from sensors, such as LIDAR, RADAR, cameras, etc., that are associated with a self-driving vehicle. The sensor readings are collected over a period of time that a vehicle is operating, and at a predetermined frequency (e.g., 10 samples per second).

At block 512, training data including training scenes and training trajectories are prepared from the self-driving vehicle data set. Moving agents, such as vehicles or pedestrians, that have been observed in motion by the self-driving vehicle for more than a predetermined period of time (e.g., five seconds) are used as prediction targets and their trajectories over a predetermined period of time (e.g., five seconds), and at a predetermined sampling frequency (e.g., five samples per second) are used as ground truth for training the machine learning models. Each scene will also include history data for a predetermined period of time (e.g., three seconds) prior to the data that will be used for the ground truth. The scenes include both static scene feature map data and time-dependent feature map data. In some implementations, the sensor data will be processed to provide feature map data for a scene as overhead or bird's eye views, having a consistent reference frame. In some implementations, this reference frame may place a prediction target (i.e., an agent) at the center of the feature map data, and may orient the feature map data so that the Y-axis of the maps is aligned with the prediction target's orientation.

It will be understood that preparation of training scenes and training trajectories, such as is described with reference to block 512, could be done prior to execution of the machine learning model training section 502. If this is the case, then the block 512 may be omitted, and the training scenes and training trajectories may be received or accessed from a database, rather than the sensor readings on which they are based.

At block 514, the training scenes and training trajectories are used to jointly train the first and second machine learning models, based on ground truth agent trajectories and corresponding scene data. The training is performed such that the first machine learning model generates current situation feature vectors based on feature maps from scene data, and the second machine learning model generates feature vectors based on the agent trajectories. The machine learning models are trained such that the feature vectors generated by the first and second machine learning models are in a common latent space and will be spatially close when the observed agent trajectory input to the second machine learning model corresponds to the feature maps from the scene that are input to the first machine learning model. The feature vectors generated by the first and second machine learning models will be spatially distant when there is no such correspondence.

At block 516, the fully trained first machine learning model is sent or otherwise provided to the agent trajectory prediction module of a self-driving vehicle, and the fully trained second machine learning model is sent or otherwise provided to the trajectory bank generation section 504 as described below.

At block 520 of the trajectory bank generation section 504, observed agent trajectories in real-world situations are received or accessed (e.g., from a database) by the trajectory bank generation section 504. In some implementations, these agent trajectories are based on sensor data from sensors on self-driving vehicles, such as LIDAR, RADAR, and cameras. In some implementations, the camera shots aligned with the LIDAR and RADAR data cover a predetermined period of time (e.g., five seconds) with a predetermined frequency of sensor data collection (e.g., 10 sensor samples per second).

At block 522, the observed agent trajectories are sampled to obtain a library of agent trajectories. By sampling from observed, real-world agent trajectories, each of the trajectories in the library of agent trajectories will be physically plausible, since it has been followed by some agent at least once. This still leaves a possible issue with overrepresentation of high-probability trajectories in the library, such as stationary trajectories or uniform forward motion, and possible underrepresentation or exclusion of uncommon trajectories that should still be represented. To address this issue, in some implementations, the sampling may be done by first applying a clustering procedure to the observed agent trajectories, and then sampling by first randomly selecting a cluster (or a cluster index) and then randomly selecting a trajectory in the selected cluster. By applying this clustering technique, trajectories with high prior probability will not be sampled as frequently, making the induced trajectory distribution from the sampling much closer to uniform. In some implementations, a mini-batch K-means algorithm, such as is described in Sculley, D., "Web-scale k-means clustering", *Proceedings of the* 19*th international conference on World wide web*, 1177-1178, 2010, with Euclidian distance in the trajectory space is used for clustering. This clustering algorithm is fast and produces results that may work well enough in practice. It will be understood that other known clustering algorithms, such as complete-linkage clustering may be used, and may provide more uniform distributions.

At block 524, a trajectory library feature vector is generated for each of the trajectories in the library of agent trajectories. In some implementations, this is done using a trained machine learning model, such as a trained artificial neural network, that was trained and provided by the machine learning model training section 502, described above. As discussed above, this machine learning model has been trained to generate a feature vector given an input trajectory. The trajectory library feature vectors are associated with the agent trajectories from which they were generated.

At block 526, the trajectory library feature vectors are assembled to form a trajectory bank of library feature vectors. In some implementations, this may be done by generating an index of the library feature vectors which will make searching the library feature vectors much faster when the trajectory bank is in use. Because the search will look for library feature vectors that are spatially close to a target vector representing a current situation of a self-driving vehicle, one structure that may be used for the index is a proximity graph. As would be well-known by those of ordinary skill in the art, a proximity graph is a graph in which two vertices are connected by an edge if the vertices are spatially close to each other using a predetermined distance metric. In accordance with some implementations, one well-known type of proximity graph is a hierarchical navigable small world graph. Methods for building such a graph and using it to perform approximate K-nearest neighbor searches are described, for example, in the Malkov and Yashunin paper that is cited above. It will be understood that other known or later developed indexing methods and/or other indexing methods based on proximity graphs may also be used.

In block 528, the trajectory bank is sent or otherwise provided to the agent trajectory prediction module of a self-driving vehicle. The agent trajectory prediction module typically executes on a computing device associated with a self-driving vehicle, and is described below with reference to FIG. 6.

It will be understood that the machine learning model training section 502 and the trajectory bank generation section 504 may be executed "offline," on a server or other computing device, prior to the use of the trained machine learning model and/or trajectory bank that they generate being used on a self-driving vehicle. Additionally, the machine learning model training section 502 and trajectory bank generation section 504 may be executed on different computing devices, and at different times.

Because the trajectory set is fixed in advance, it can be limited to contain only physically plausible agent trajectories. This may simplify the modeling problem for the machine learning models and prevent the making of completely wrong predictions in areas of the problem space where the prediction quality is poor. In some implementations, the trajectory set may be enriched with trajectories corresponding to complex maneuvers, thus ensuring that such maneuvers can be predicted and handled.

Additionally, by building an indexed trajectory bank, predictions can be made by scoring potential solutions. This is computationally much simpler than generating a prediction from scratch. Thus, by formulating the problem of predicting the trajectories of agents as a scoring problem, it may be possible to increase prediction quality while keeping the latency associated with making predictions low.

Figure 6:
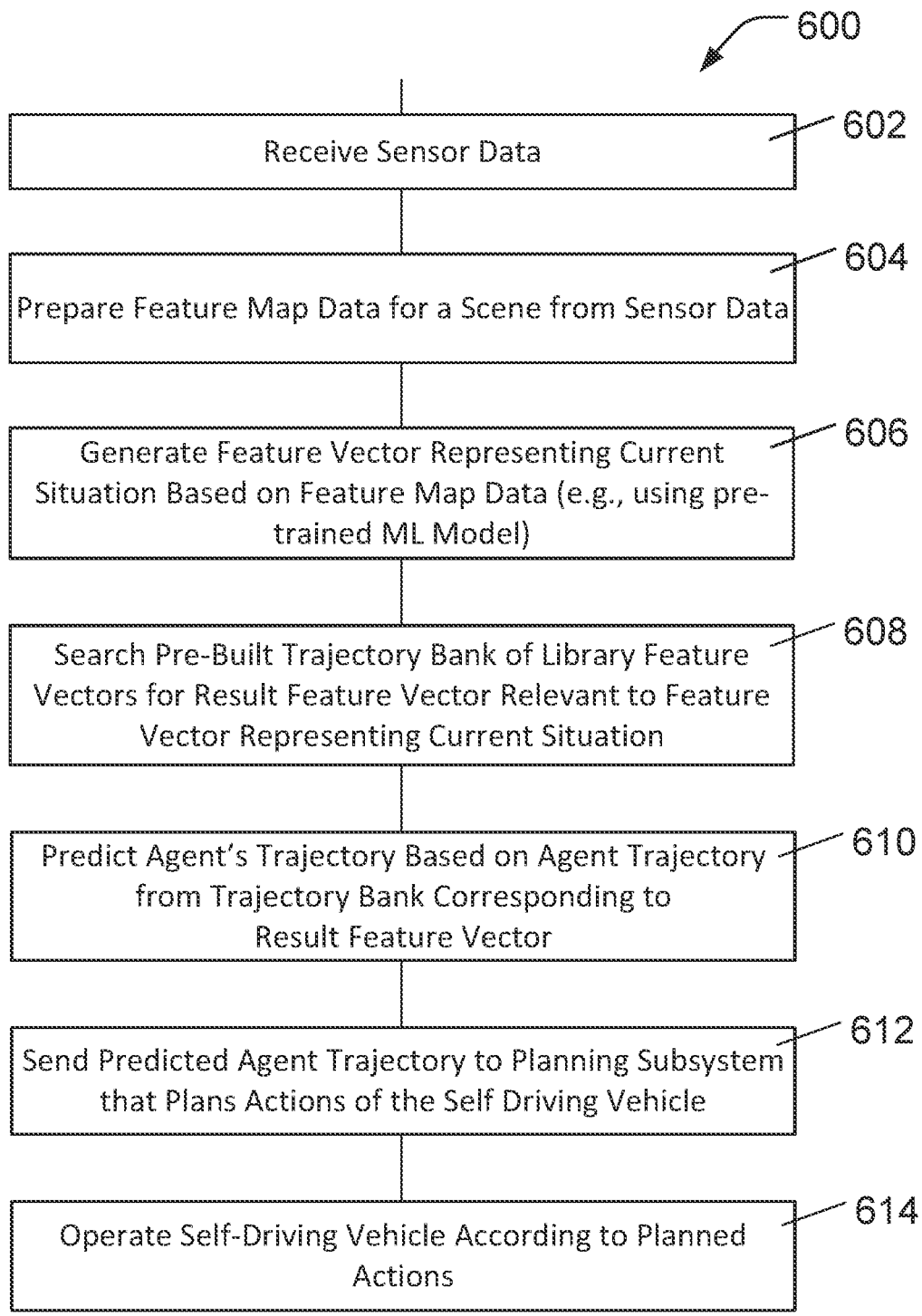
FIG. 6 shows a flowchart of an agent trajectory prediction method in accordance with various implementations of the disclosed technology.

FIG. 6 shows a flowchart of a method 600 of predicting agent trajectories in accordance with various implementations of the disclosed technology. In some implementations, the method 600 is implemented as an agent trajectory prediction module executing on a computing device associated with a self-driving vehicle.

At block 602, sensor data is received from sensors associated with a self-driving vehicle. The sensor data may include data from sensors such as LIDAR, RADAR, cameras, and other sensors used on a self-driving vehicle, and may represent the current situation in the vicinity of the self-driving vehicle over a predetermined period of time prior to the prediction of the agent trajectory.

At block 604, the sensor data is processed to provide feature map data for a scene as overhead or bird's eye views, having a consistent reference frame. In some implementations, this reference frame may place an agent for which a trajectory prediction is being generated at the center of the feature map data (e.g., by using the center of a bounding box for an agent as the center of the feature maps) and may orient the feature map data so that the Y-axis of the maps is aligned with the agent's orientation.

At block 606, a feature vector representing a current situation is generated based on the feature map data for the scene. In some implementations, this may be done using a pre-trained machine learning model, such as an artificial neural network, that maps the feature map data for the scene to a feature vector. This pre-trained machine learning model may be trained and provided by the machine learning model training section 502, described above with reference to FIG. 5.

At block 608, a pre-built trajectory bank of library feature vectors 414, in which each of the library feature vectors represents a possible trajectory for the agent, is searched for feature vectors that are relevant to the feature vector representing a current situation. In some implementation, this may take the form of computing a relevance score for a set of the library feature vectors. In some implementations the search may be done using an approximate K-nearest neighbor search, which may use, for example, a pre-built hierarchical navigable small world graph, such as is described in the Malkov and Yashunin paper cited above. It will be understood that other known or later developed K-nearest neighbor search algorithms or methods could be used, or the search could be performed using another known or later developed matching or search algorithm.

This search may produce a set of relevance scores for the set of library feature vectors. These relevance scores may, for example, be based on a spatial distance between the library feature vectors and the feature vector representing the current situation, or on other relevance measures. Once these relevance scores are computed, the most relevant library feature vector may be selected as the result feature vector. In some implementations, the set of library feature vectors may be ranked according to their relevance scores, forming a ranked list. This ranked list may be used to select a result feature vector to be used for a prediction of the agent trajectory.

At block 610 the agent's trajectory is predicted based on an agent trajectory from the trajectory bank that corresponds to the result feature vector. In some implementations, the prediction method described above may be repeated for each agent of interest that is detected in the vicinity of the self-driving vehicle.

At block 612, the predicted trajectory may be sent to a planning subsystem associated with the self-driving vehicle. In some implementations, the planning subsystem executes on the same computing device as the agent trajectory prediction module. The planning subsystem takes the predicted trajectory for the agent into account when planning actions of the self-driving vehicle. At block 614, the self-driving vehicle is operated according to these planned actions.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of generating a bank of library feature vectors for use in predicting a trajectory of an agent in a vicinity of an in-use self-driving vehicle, the method comprising:

receiving, on a server, a plurality of observation samples, each observation sample collected by a sensor on a data collection self-driving vehicle, each observation sample including data on a trajectory of an observed agent in the vicinity of the data collection self-driving vehicle over a predetermined period of time;

generating a library of agent trajectories by:
  clustering agent trajectories from at least a first portion of the plurality of observation samples into a plurality of clusters, each cluster in the plurality of clusters containing similar agent trajectories,
  randomly selecting a cluster from the plurality of clusters, and
  randomly selecting an agent trajectory, to be added to the library of agent trajectories, from the selected cluster;

generating, on the server, a library feature vector for each trajectory in the library of agent trajectories;

assembling, on the server, the bank of library feature vectors based, at least in part, on the library feature vectors, wherein each library feature vector in the bank of library feature vectors represents a possible future trajectory for the agent in the vicinity of the data collection self-driving vehicle; and sending the bank of library feature vectors to a computing device of the in-use self-driving vehicle.

2. The method of claim 1, wherein assembling, on the server, the bank of library feature vectors further comprises generating an index of library feature vectors in the bank of library feature vectors.

3. The method of claim 2, wherein generating the index of library feature vectors comprises generating a proximity graph of the library feature vectors.

4. The method of claim 3, wherein the proximity graph comprises a hierarchical navigable small world graph.

5. The method of claim 1, wherein generating, on the server, the library feature vector for each trajectory in the library of agent trajectories comprises using a neural network to generate the library feature vector from each trajectory in the library of agent trajectories.

6. The method of claim 1, wherein each observation sample further includes data on a scene surrounding the observed agent, and wherein the method further comprises:
  using at least a second portion of the plurality of observation samples for training a first neural network to generate first feature vectors based on input of the scenes surrounding the observed agents; and
  using at least the second portion of the plurality of observation samples for jointly training a second neural network to generate second feature vectors based on input of the trajectories of the observed agents; and
  wherein the first feature vectors and second feature vectors will be close when the trajectory of an observed agent corresponds to the scene surrounding that observed agent.

7. The method of claim 1, further comprising:
predicting, by the computing device of the in-use self-driving vehicle, a trajectory of an agent in a vicinity of the in-use self-driving vehicle by:
  receiving sensor data indicative of a current situation in the vicinity of the in-use self-driving vehicle from a sensor associated with the in-use self-driving vehicle;
  generating a current situation feature vector based, at least in part, on the sensor data;
  searching the bank of library feature vectors to identify a result feature vector from the bank of library feature vectors that is most relevant to the current situation feature vector; and
  predicting the trajectory of the agent based, at least in part, on the result feature vector;
planning, by the computing device of the in-use self-driving vehicle, an action of the in-use self-driving vehicle based, at least in part, on the predicted trajectory of the agent; and
operating the in-use self-driving vehicle according to the planned action.

8. The method of claim 7, wherein generating the current situation feature vector comprises using a pre-trained neural network to generate the current situation feature vector.

9. The method of claim 8, wherein using the pre-trained neural network comprises providing a feature map representing aspects of a birds-eye view of the current situation in the vicinity of the in-use self-driving vehicle, based, at least in part, on the sensor data as input to the pre-trained neural network.

10. The method of claim 9, wherein the feature map is centered on the agent, and has an orientation based on an orientation of the agent.

11. The method of claim 7, wherein searching the bank of library feature vectors comprises performing an approximate nearest neighbor search.

12. The method of claim 11, wherein the bank of library feature vectors includes an index based on a hierarchical navigable small world graph, and wherein performing the approximate nearest neighbor search comprises traversing the hierarchical navigable small world graph.

13. The method of claim 7, wherein the result feature vector comprises the library feature vector that is closest to the current situation feature vector.

14. The method of claim 7, wherein searching the bank of library feature vectors comprises generating a ranked list of feature vectors from the bank of library feature vectors.

15. The method of claim 14, wherein generating the ranked list of feature vectors comprises ranking the library feature vectors based, at least in part, on a measure of relevance of the library feature vectors to the current situation feature vector.

16. A server comprising:
a processor;
a memory coupled to the processor, the memory comprising programmed instructions that when executed by the processor cause the processor to:
  access, on the server, a plurality of observation samples, each observation sample collected by a sensor on a data collection self-driving vehicle, each observation sample including data on a trajectory of an observed agent in a vicinity of the data collection self-driving vehicle over a predetermined period of time;
  generate a library of agent trajectories by:
    clustering agent trajectories from at least a first portion of the plurality of observation samples into a plurality of clusters, each cluster in the plurality of clusters containing similar agent trajectories,
    randomly selecting a cluster from the plurality of clusters, and
    randomly selecting an agent trajectory, to be added to the library of agent trajectories, from the selected cluster;
  generate, on the server, a library feature vector for each trajectory in the library of agent trajectories;

assemble, on the server, a bank of library feature vectors based, at least in part, on the library feature vectors, wherein each library feature vector in the bank of library feature vectors represents a possible future trajectory for the agent in the vicinity of the data collection self-driving vehicle; and provide the bank of library feature vectors to a computing device of a self-driving vehicle.

17. A system comprising the server of claim 16 and the self-driving vehicle, wherein the self-driving vehicle comprises:

at least one sensor;

a computing device including a processor and a memory, the memory storing programmed instructions that when executed by the processor cause the computing device to:

predict a trajectory of an agent in a vicinity of the self-driving vehicle by:

receiving sensor data indicative of a current situation in the vicinity of the self-driving vehicle from the at least one sensor;

generating a current situation feature vector based, at least in part, on the sensor data;

searching the bank of library feature vectors to identify a result feature vector from the bank of library feature vectors that is most relevant to the current situation feature vector; and predicting the trajectory of the agent based, at least in part, on the result feature vector;

plan an action of the self-driving vehicle based, at least in part, on the predicted trajectory of the agent; and operate the self-driving vehicle according to the planned action.

18. The system of claim 17, wherein the self-driving vehicle comprising a self-driving car.

\* \* \* \* \*